United States Patent Office 3,579,567
Patented May 18, 1971

3,579,567
TRICYCLO[4.4.0.0³·⁸]DECAN-1-AMINE AND
PROCESS FOR PREPARING SAME
Pierre Deslongchamps, Sherbrooke, Quebec, Canada, assignor to Ayerst, McKenna and Harrison Limited, Ville St. Laurent, Quebec, Canada
No Drawing. Filed July 10, 1968, Ser. No. 743,623
Int. Cl. C07c 69/14, 87/02, 103/32
U.S. Cl. 260—488  10 Claims

ABSTRACT OF THE DISCLOSURE

There is disclosed herein tricyclo[4.4.0.0³·⁸]decan-1-amine and the intermediates used in this preparation 8-hydroxytricyclo[4.4.0.0³·⁸]decan-4-one acetate, 8-hydroxytricyclo[4.4.0.0³·⁸]decan-4-one acetate thioketal, tricyclo [4.4.0.0³·⁸]decan-1-ol acetate, tricyclo[4.4.0.0³·⁸]decan-1-ol, and N-1-tricyclo[4.4.0.0³·⁸]decanylacetamide. The compound possesses anti-viral properties, and methods for its use as well as a process for its preparation are also disclosed.

This invention relates to the novel tricyclic amine, tricyclo[4.4.0.0.³·⁸]decan-1-amine, to intermediates used in its synthesis and to a process for its preparation.

Furthermore, this invention includes the non-toxic, pharmaceutically acceptable acid addition salts of tricyclo [4.4.0.0³·⁸]decan-1-amine. Such salts are prepared from suitable acids, such as inorganic acids, for instance, hydrochloric, hydrobromic, sulfuric, phosphoric, or sulfamic acid; or organic acids, for instance, acetic, maleic, lactic, ethanedisulfonic, glycolic, salicylic and fumaric acids. The acid addition salts are prepared by reacting tricyclo [4.4.0.0³·⁸]decan-1-amine with either one equivalent of acid or preferably an excess in an organic solvent such as ether or an ethanol-ether mixture.

The compound of this invention, tricyclo[4.4.0.0³·⁸]decan-1-amine, may be represented by the Formula I.

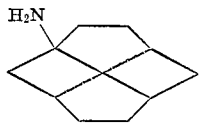

I

The compound of this invention, tricyclo[4.4.0.0³·⁸]decan-1-amine possesses useful antiviral activity. This activity is readily demonstrated in standard pharmaceutical tests, such as, for example, the tests described by R. C. Stewart in "Pharmacological Techniques in Drug Evaluation" by Year Book Medical Publishers, Inc., volume 2, page 576. More specifically, the compound of this invention shows antiviral activity against certain strains of influenza, especially influenza A and influenza A'.

When the compound of this invention is used as an antiviral agent in warm-blooded animals, for example, mice, it may be employed alone or in combination with pharmacologically acceptable carriers. When employed with a pharmacologically acceptable carrier, the proportion of this agent is determined by its solubility and chosen route of administration. For example the compound may be administered orally in solid form containing such excipients as starch, milk sugar, certain types of clay and so forth. Also it may be administered orally in the form of solutions or it may be injected parenterally. For parenteral administration it may be used in the form of a sterile solution containing other solutes, for example, enough saline or glucose to make the solution isotonic.

The dosage of the present therapeutic agent will vary with the form of administration. Furthermore, it will vary with the particular host under treatment. Generally, treatment is initiated with small dosages substantially less than the optimum dose of the compound. Thereafter, the dosage is increased by small increments until the optimum effect under the circumstances is reached. In general, the compound of this invention is most desirably administered at a concentration level that will generally afford effective results without causing any harmful or deleterious side effects and preferably at a level that is in a range of from about 0.5 mg. to about 100 mg. per kilo per day, although as aforementioned variations will occur. However, a dosage level that is in the range of from about 2 mg. to about 10 mg. per kilo per day is most satisfactory. Such doses may be administered once or twice a day, as required.

The compound of this invention is prepared by a process illustrated by the following formulae:

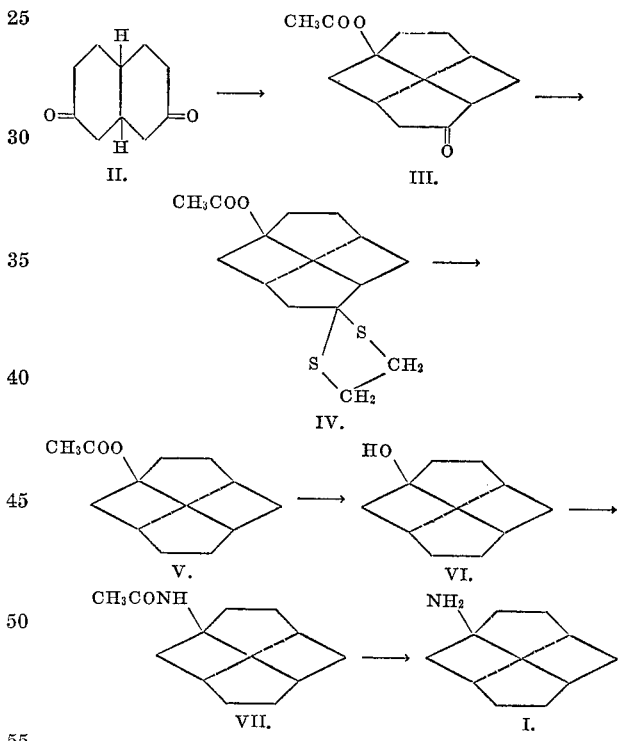

For the process outlined above I prefer to use as starting material the compound, Decalin-2,7-dione of Formula II, described by A. G. Anderson and D. O. Barlow, J. Am. Chem. Soc. 77, 5165 (1955). Treatment of the starting material (II) with a mixture of a lower alkanoic acid such as, acetic acid, a lower alkanoic anhydride, such as acetic anhydride, and boron trifluoride at room temperature affords the 8-hydroxytricyclo[4.4.0.0$^{3,8}$]decan-4-one acetate of Formula III. The latter compound is converted to its corresponding thioketal of Formula IV by treatment with ethane dithiol in a conventional manner. Desulfurization of the thioketal IV with an excess of Raney nickel in boiling ethanol for two days yields tricyclo[4.4.0$^{3,8}$]decan-1-ol acetate of Formula V. The latter compound is converted to its corresponding free hydroxy derivative of Formula VI, tricyclo[4.4.0.0$^{3,8}$]decan-1-ol, preferably by reductive hydrolysis with lithium aluminum hydride; alternatively, hydrolysis with a dilute acid, such as, for example, dilute hydrochloric acid, or with a dilute base, such as, for example, dilute sodium carbonate, may be used to achieve this conversion.

Treatment of tricyclo[4.4.0.0$^{3,8}$]decan-1-ol (VI) with acetonitrile and sulfuric acid readily affords N-1-tricyclo[4.4.0.0$^{3,8}$]decanylacetamide of Formula VII, which upon hydrolysis, preferably by boiling with dilute sodium hydroxide in diethylene glycol, yields the compound of this invention.

The following examples will illustrate this invention.

EXAMPLE 1

8-hydroxytricyclo[4.4.0.0$^{3,8}$]decan-4-one acetate (III)

A solution of Decalin-2,7-dione (1.0 g.) in 20 ml. of acetic acid and 8 ml. of acetic anhydride is treated with 9.6 ml. of freshly distilled boron trifluoride-ethyl ether complex and allowed to stand at room temperature for 22 hours. The reaction mixture is extracted with 40 ml. of chloroform. The chloroform extract is washed in turn with water, 5% aqueous sodium carbonate, and water, dried over magnesium sulfate, filtered and evaporated to dryness. The oily residue is subjected to chromatography on a column of 25 g. of alumina. The column is eluted with petroleum ether and 25% petroleum ether in benzene. The combined eluates are evaporated to dryness. The residual colorless oil is crystallized from petroleum ether to afford the title compound (III) as colorless crystals, M.P. 66–68° C.

EXAMPLE 2

8-hydroxytricyclo[4.4.0.0$^{3,8}$]decan-4-one acetate thioketal (IV)

Freshly distilled boronitrifluoride-ether complex (50 ml.) is added to a solution of 4 g. of 8-hydroxytricyclo[4.4.0.0$^{3,8}$]decan-4-one acetate (III) and 4.0 ml. of ethane dithiol in 300 ml. of glacial acetic acid. The mixture is stirred at room temperature for 24 hours, diluted with 1.5 l. of water and extracted with ether (5× 250 ml.). The ether extract is washed with dilute sodium carbonate, and then water, dried over magnesium sulfate, filtered and evaporated to dryness to afford the title compound, suitable for use in the following step (Example 3), as a crude oil. The residual crude oil is crystallized from petroleum ether to yield the pure title compound (IV), M.P. 71° C.

EXAMPLE 3

Tricyclo[4.4.0.0$^{3,8}$]decan-1-ol acetate (V)

A solution of crude 8-hydroxytricyclo[4.4.0.0$^{3,8}$]decan-4-one acetate thioketal (IV, 8.0 g.) in 400 ml. of absolute ethanol is treated with 7.0 g. of Raney nickel and boiled for 12 hours. During the time small portions of fresh Raney nickel are added at two hour intervals. The reaction mixture is cooled and filtered through celite. Raney nickel (30 g.) is added to the filtered solution and the resultant mixture is boiled for 12 hours. The mixture is now cooled and filtered through celite, diluted with water (3 l.) and extracted with pentane (4× 250 ml.). The pentane extract is dried over magnesium sulfate, filtered, and evaporated to dryness yielding the title compound (V) as a colourless oil, B.P. 80–82° C./0.4–0.5 mm.

EXAMPLE 4

Tricyclo[4.4.0.0$^{3,8}$]decan-1-ol acetate (VI)

A mixture of tricyclo[4.4.0.0$^{3,8}$]decan-1-ol acetate (V, 200 mg.) and lithium aluminum hydride (200 mg.) in 25 ml. of ether is stirred and boiled for six hours. Excess lithium aluminum hydride is decomposed by the careful dropwise addition of water. After addition of magnesium sulfate, the reaction mixture is filtered. The filtrate is evaporated to dryness to yield the title compound (VI) which is purified by crystallization from petroleum ether to M.P. 215° C.

EXAMPLE 5

N-1-tricyclo[4.4.0.0$^{3,8}$]decanylacetamide (VII)

Tricyclo[4.4.0.0$^{3,8}$]decan-1-ol (VI, 579 mg.) is dissolved in 10 ml. of acetonitrile, cooled in an ice bath, stirred and treated dropwise with a cold solution of 3.8 ml. of sulfuric acid in 10 ml. of acetonitrile over a period of 30 minutes. After standing at room temperature for 12 hours, the reaction mixture is cooled in an ice bath and a solution of sodium hydroxide (6 g. in 20 ml. of water) is added slowly. A small amount of water is added to dissolve the resulting sodium sulfate precipitate. The mixture is extracted with ether 6× 40 ml.). The ether extract is washed once with brine, dried over magnesium sulfate, filtered and evaporated to dryness. The crystalline residue is recrystallized from petroleum ether to afford the pure title compound (VII), M.P. 129–131° C.

EXAMPLE 6

Tricyclo[4.4.0.0$^{3,8}$]decan-1-amine (I)

N-1-tricyclo[4.4.0.0$^{3,8}$]decanylacetamide (VII, 522 mg.) is dissolved in 10 ml. of warm diethylene glycol. Sodium hydroxide (1.0 g.) is added to the solution at room temperature. The mixture is refluxed (oil bath temperature, 240–250° C.) under nitrogen for four hours. After cooling, the mixture is treated with 40 ml. of brine and then extracted with ether (8×30 ml.). The ether extract is dried over magnesium sulfate, filtered and evaporated to dryness to yield the title compound (I) as an oil which slowly solidified. A portion of this crude product is sublimed to give the pure title compound, M.P. 184–185° C., $\nu_{max}^{NaCl}$ 3300 and 1600 cm.$^{-1}$ The hydrochloride salt of the title compound is prepared by treating a solution of the above crude product in ether with excess dry hydrogen chloride. The resulting precipitate is collected and recrystallized from methanolether (1:60) to give tricyclo[4.4.0.0$^{3,8}$]decan-1-amine hydrochloride, M.P. above 360° C.

I claim:

1. A compound selected from the group which consists of tricyclo[4.4.0.0$^{3,8}$]decan-1-amine and non-toxic pharmaceutically acceptable acid addition salts thereof.

2. A compound as described in claim 1 which is: tricyclo[4.4.0.0$^{3,8}$]decan-1-amine.

3. A compound as described in claim 1 which is the hydrochloride salt of tricyclo[4.4.0.0$^{3,8}$]decan-1-amine.

4. Tricyclo[4.4.0.0$^{3,8}$]decan-1-ol acetate.

5. Tricyclo[4.4.0.0$^{3,8}$]decan-1-ol.

6. N-1-tricyclo[4.4.0.0$^{3,8}$]decanylacetamide.

7. The process which comprises treating Decalin-2,7-dione with a mixture of a lower alkanoic acid, a lower alkanoic anhydride and boron trifluoride, thereby securing 8-hydroxytricyclo[4.4.0.0$^{3,8}$]decan-4-one acetate; converting said last-named compound to its corresponding thioketal by treating it with ethane dithiol in glacial acetic acid; desulfurizing said thioketal compound by bringing it into contact with excess Raney nickel in boiling ethanol, thereby securing tricyclo[4.4.0.0$^{3,8}$]decan-1-ol acetate; converting said last-named acetate to its corresponding free hydroxy derivative, tricyclo[4.4.0.0$^{3,8}$]decan-1-ol; treating said last-named compound with acetonitrile and sulfuric acid, thereby securing N-1-tricyclo[4.4.0.0$^{3,8}$]decanylacetamide; and subjecting said last named compound to hydrolysis, thereby securing tricyclo[4.4.0.0$^{3.8}$]decan-1-amine.

8. The process as defined in claim 7 wherein said tricyclo[4.4.0.0$^{3.8}$]decan-1-ol acetate is converted to tricyclo[4.4.0.0$^{3.8}$]decan-1-ol by subjecting said acetate to reductive hydrolysis with lithium aluminum hydride.

9. The process as defined in claim 7 wherein said tricyclo[4.4.0.0$^{3.8}$]decan-1-ol acetate is converted to tricyclo[4.4.0.0$^{3.8}$]decan-1-ol by subjecting said acetate to hydrolysis with a dilute acid.

10. The process as defined in claim 7 wherein said tricyclo[4.4.0.0$^{3.8}$]decan-1-ol acetate is converted to tricyclo[4.4.0.0$^{3.8}$]decan-1-ol by subjecting said acetate to hydrolysis with a dilute base.

References Cited
UNITED STATES PATENTS

| | | | |
|---|---|---|---|
| 2,817,673 | 12/1957 | Roelen et al. | 260—617 |
| 3,256,329 | 6/1966 | Kauer | 260—563 |
| 3,444,199 | 5/1969 | Whitney | 260—563 |
| 3,496,227 | 2/1970 | Vogt | 260—563 |
| 3,496,228 | 2/1970 | Hoover | 260—563 |

LORRAINE A. WEINBERGER, Primary Examiner

V. GARNER, Assistant Examiner

U.S. Cl. X.R.

260—491, 501.1, 501.21, 561, 563, 617; 424—199, 316, 325

UNITED STATES PATENT OFFICE
CERTIFICATE OF CORRECTION

Patent No. 3,579,567        Dated May 18, 1971

Inventor(s) Pierre Deslongchamps

It is certified that error appears in the above-identified patent and that said Letters Patent are hereby corrected as shown below:

Column 3, Example 2, line 46 should read --borontrifluoride-ether--

Column 4, Example 4, the title "Tricyclo[4,4,0$^{3.8}$]decan-1-ol acetate (VI)" should read --Tricyclo[4.4.0$^{3.8}$]decan-1-ol(VI)--

Signed and sealed this 26th day of October 1971.

(SEAL)
Attest:

EDWARD M. FLETCHER, JR.      ROBERT GOTTSCHALK
Attesting Officer             Acting Commissioner of Patents